United States Patent Office 2,811,891
Patented Nov. 5, 1957

2,811,891

FLAME SPECTROCHEMICAL ANALYSIS OF BODY FLUIDS AND COMPOSITIONS FOR USE THEREWITH

Thomas C. Roddy, Jr., Port Arthur, Tex.

No Drawing. Application May 25, 1954,
Serial No. 432,301

3 Claims. (Cl. 88—14)

This invention relates to spectrochemical analysis and to compositions for use therewith. More particularly, it is concerned with (a) the spectrochemical analysis of organic solutions such as blood, urine and isotonic stomach pumpings to determine the sodium, potassium and calcium concentrations in the organic solutions and with (b) a set of standard solutions for use in carrying out the new analytical procedures.

FIELD OF INVENTION

The electrolyte balance in body fluids, e. g., urine and blood serum is an important factor in the control of certain diseases as well as the maintenance of healthy conditions in human beings and animals. Although the importance of this electrolyte balance has been known for sometime by the medical profession, full use of this knowledge has been handicapped by the absence of a suitable means for analysis for sodium, potassium and calcium content in the body fluids.

There are various general analytical methods used for determination of ion concentrations in aqueous solutions which seemingly might be used with blood serum, but flame photometry appeared to offer probably more promise than any as a means for analysis of sodium, potassium and calcium content of blood serum. However, the protein content of the blood serum has been found to promote errors up to 20% in such flame photometry operations. Furthermore, the very emissive sodium content has been found to produce errors in the determination of the potassium and calcium concentrations due to stray light phenomena, spectral band interference and catalytic emission.

Various expedients have been tried to overcome the difficulties attendant with the flame photometry of body fluids, particularly blood serum, but these have not given consistently satisfactory results. For example, extreme dilution of the solutions under test overcomes most of the protein interference, but errors in analysis are multiplied many fold in the final calculations until the final data are questionable and in many cases unuseable. The determination of calcium ion concentration is impossible with the extreme dilution method. Various deproteinizing agents, e. g., trichloroacetic acid, have been used to precipitate the protein from the serum, but this was found to alter the results of the potassium determinations. Furthermore, calcium impurities in trichloroacetic acid result in erratic calcium values. The phosphorous content of blood serum also interferes with the flame photometry analysis if not carefully controlled.

OBJECTS

A principal object of this invention is the provision of new spectrochemical analytical procedures and new compositions for use in carrying out these procedures. Further objects include:

(1) The provision of spectrochemical analytical procedures which may be used to obtain reliable data on the sodium, potassium and calcium content of organic solutions such as blood serum, urine and isotonic stomach pumpings.

(2) The provision of new spectrophotometric procedures for the analysis of the sodium, potassium and calcium content of blood samples, urine and other organic material containing solutions.

(3) The provision of new compositions for use in overcoming error-producing factors previously associated with the spectrochemical analysis of organic solutions for sodium, potassium and calcium ion content.

(4) The provision of a set of standard aqueous solutions which overcome the protein error, phosphorus error and sodium error in the potassium and calcium analysis of organic solutions by spectrochemical methods.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention through the use of a set of standard analysis solutions which, inter alia, compensate for protein interference and for the errors due to the sodium content of the test solutions during spectrochemical analysis of blood samples. A set of standards according to the present invention preferably comprises three separate aqueous solutions having sodium ion, potassium ion and calcium ion concentrations in controlled proportions as will be more fully explained hereinafter. However, it is possible to use a set of standards containing more than three separate solutions provided the general relationship between sodium ion, potassium ion and calcium ion concentrations as mentioned is maintained in all the solutions in the set of standards.

According to the present invention, the analysis for sodium, potassium and calcium content of a blood sample is accomplished by taking a measured quantity of blood serum, preferably obtained by centrifuging a freshly obtained blood sample, adding a deproteinizing agent, e. g., trichloroacetic acid, to the blood serum, clarifying the resulting mixture such as by centrifuging the mixture to obtain a clear solution, and then feeding the clarified solution into a flame or other means designed to produce an ignition of the solution and formation of an emission spectrum of the solid element content of the ignited solution, dispersing the light from the ignition flame into a spectrum and then comparing the intensity of some principal spectral line of calcium, potassium and sodium of the resulting ignition spectrum with the same lines of the spectrum obtained by ignition of the separate solutions of the set of standards mentioned above.

The success of the present invention is due to a large extent to the discovery that special solutions can be formulated and successfully used as standards for the spectrophotometric analysis of blood serum. The use of standard solutions in spectrochemical analysis is not new, but the provision of standard solutions for use in blood analysis is unique. Thus, past experience in the art has led to the general opinion that standard solutions are not applicable to spectrochemical analysis of organic-containing solutions such as serum (see, for example, "Spectrochemical Procedures" by C. E. Harvey, published by Applied Research Laboratories (1950), page 226). However, it has now been discovered that standard solutions can be compounded which will substantially completely eliminate the errors in the spectrochemical anal-
} ysis of blood serum which have heretofore made the results of such operations unreliable or unuseable.

*Example*

A more complete understanding of the new methods and compositions of this invention can be had by reference to the following example of an actual determination of the sodium, potassium and calcium ion content of a blood serum sample using the new methods and set of standard solutions.

A sample of about 5 ml. of whole blood is obtained from a patient and the blood is centrifuged to separate the red cells from the serum. One ml. of the serum is added to a graduated centrifuge tube containing 2 to 3 ml. of distilled water, 4 ml. of a 10% by weight aqueous solution of trichloroacetic acid is added to the tube and the volume is made up to 10 ml. with distilled water. This mixture is centrifuged until the solution becomes clear through separation of the precipitate containing the protein content of the serum.

A flame spectrophotometer is prepared for the analysis by placing in operation the amplifier circuit used in metering the output of the photoelectric tube of the photometer and adjusting the oxy-acetylene burner to give a flame of appropriate size. The burner for the flame has a depending capillary tube which connects to a Venturi unit within the burner joined to the oxygen supply tube of the burner so that passage of oxygen into the burner creates a suction on the depending capillary. By placing a small beaker or vial of test liquid against the lower open end of the capillary, and maintaining a fixed oxygen pressure to the burner, a constant amount of sample solution is sucked into the capillary and accordingly ignited in the flame of the photometer burner.

With the flame photometer in operating condition as mentioned above, the wave length scale is set at 7665 A. The slit width is adjusted to be sufficiently wide to give suitable transmission readings on the meter scale of the instrument, but small enough to keep the readings on the scale. The clarified solution obtained through deproteinizing of the serum is put in operating position below the capillary and the solution is allowed to feed in to the burner. The meter reading of intensity (i. e., percent transmission) for this spectra light of the emission spectrum from the flame is recorded.

The sample holder is withdrawn from below the burner capillary and using the same procedure, the relative intensity of emission for the 7665 A. spectra line is determined for three test standard solutions having the composition given below in Table I. Similarly, the emission intensity of the sample and three test standard solutions is determined with a wave length dial setting of 5540 A. after the determinations for the 7665 A. line have been completed.

TABLE I

Solution No. I:
    1.0 ml. standard solution A
    5.0 ml. distilled water
    4.0 ml. TCAA
Solution No. II:
    1.0 ml. standard solution B
    5.0 ml. distilled water
    4.0 ml TCAA
Solution No. III:
    1.0 ml. standard solution C
    5.0 ml. distilled water
    4.0 ml. TCAA (TCAA=10 parts by weight trichloroacetic acid dissolved in 90 parts by weight of distilled water)

The standard solutions A, B and C mentioned above have the compositions given in the following Table II:

TABLE II

| Solution | Sodium | Potassium | Calcium |
|---|---|---|---|
| A | 140 (3,219) | 2.5 (97) | 2.5 (50) |
| B | 140 (3,219) | 5.0 (196) | 5.0 (100) |
| C | 140 (3,219) | 7.5 (293) | 7.5 (150) |

In Table II, the first figures in each column give the respective sodium, potassium, and calcium concentration of each solution in milliequivalents of the element per liter of solution and the second figures in each column (in parenthesis) give the parts by weight of sodium chloride, potassium chloride and calcium chloride per million parts of distilled water present in the indicated solution.

The meter readings (percent transmission) which are obtained for the two different wave length settings of the photometer on each of the four solutions, (three standard solutions and one test solution) are given in the following Table III:

TABLE III

| Solution | 7,665 A. | 5,540 A. |
|---|---|---|
| I | 24 | 17 |
| II | 42 | 25 |
| III | 60 | 49 |
| Test | 40 | 27 |

The data of the standard solutions I to III when plotted on rectangular graph paper using milliequivalents per liter of the metal ion as abscissa and the meter readings for ordinates, give a straight line. By so plotting the data of the Table III, it is found that the test sample of serum contains 4.7 milliequivalents of potassium per liter and 5.3 milliequivalents of calcium per liter.

Analysis of the sodium content of the serum sample is run with a photometer setting of 5893 A. The transmission readings for sodium in flame photometry do not give a straight line as do calcium and potassium, and, therefore, more standards are used for determining the sodium ion concentration than with calcium and potassium. However, the standard solutions used for the determination of sodium contain only a water soluble sodium salt and therefore differ from the standard test solutions used for calcium and potassium which contain in addition to the test ion, the other two ions from the group sodium, potassium and calcium.

The determination of the sodium content is run using a test solution prepared by mixing 1 ml. of centrifuged, protein-freed serum with 4 ml. of 10% trichloroacetic acid solution and 5 ml. of distilled water. This solution is photometrically compared with four standard solutions *a*, *b*, *c* and *d* likewise diluted with the deproteinizing agent solution and distilled water.

The following Table IV lists the composition of the four concentrated solutions of sodium chloride used as a set of standards for the determination of sodium in the serum sample and also gives the photometer readings which are obtained for the diluted test and diluted standard solutions:

TABLE IV

| Solution | m. eq. Na | p. p. m. Na | p. p. m. NaCl | Percent Transmission |
|---|---|---|---|---|
| a | 50 | 1,150 | 2,900 | 30 |
| b | 100 | 2,300 | 5,800 | 50 |
| c | 150 | 3,500 | 8,700 | 65 |
| d | 200 | 4,600 | 11,600 | 75 |
| Test | | | | 62 |

By plotting the data of Table IV on rectangular graph paper, it is found that the sodium content of the serum under test is 145 milliequivalents of sodium per liter of serum.

DETAILED DESCRIPTION

The new procedures and compositions of this invention may be used in general for spectrochemical analysis of organic material containing solutions such as body fluids, e. g., urine and isotonic stomach pumpings, but they are particularly suited for analysis of blood serum. Further, they may be used with various spectrochemical techniques, e. g., spectrographic analysis, but they are capable of giving the most desirable and speedy results with spectrophotometric analysis, i. e., analysis in which the light energy of a given wave length is converted to electrical energy via a photoelectric cell and the electric energy is then measured, for example, by balancing the circuit with a variable resistance.

Various forms and types of spectrochemical equipment may be used although some give better results than others. The emission spectra, for example, can be obtained in various ways such as by an arc or spark. However, ignition in a gas flame is preferred and best results are obtained using an oxy-acetylene flame generated in a burner provided with the venturi sampling capillary device discussed in the example above. Such an arrangement permits a fixed amount of test solution to be ignited per unit time so that emission line intensities will be determined under comparable conditions for each wave length and sample tested during a given run.

Different principle emission lines of the spectra of sodium, calcium and potassium may be used in carrying out the analysis. However, it has been found that wave length settings of 5893 A. for sodium, 5540 A. for calcium and 7665 A. for potassium are best for the flame photometric operations. The exact settings for wave lengths employed with any given spectrophotometric apparatus may vary slightly from these values because of inherent factors present in the photocells of the equipment or for other reasons. However, the indicated wave lengths give the spectral regions where the determinations are best made according to the new procedures and the skilled analyst will understand how these exact figures for wave length setting should be altered to accommodate the equipment which he is using.

The new set of standard solutions as provided by this invention are a critical part of the new spectrochemical analytical methods. Although there can be variations in the compositions of these solutions, particularly prior to the time when they are actually ignited, the composition of the solutions in the standards must be within specific limits at this ignition stage of the operation. The critical characteristics of the standard solutions is their sodium, calcium and potassium content. At the time the solutions are ignited, a standard comprising three solutions should have the compositions given in the following table A:

TABLE A

| Standard Solution | Calcium | Potassium | Sodium |
|---|---|---|---|
| A | 0.1 to 0.3 | 0.1 to 0.3 | 11 to 16 |
| B | 0.3 to 0.6 | 0.3 to 0.6 | 11 to 16 |
| C | 0.6 to 1.0 | 0.6 to 1.0 | 11 to 16 |

In Table A the "Standard Solution" designates three separate solutions A, B and C having a sodium content designated, in milliequivalents per liter of solution, in the "Sodium" column and similarly the calcium and potassium content of the solutions in the other columns. A separate set of standards to be used in the sodium determination comprises four separate solutions of 0.0, 5.0, 10, 15 and 20 m. eq. Na/liter.

The standard solutions listed in Table A can be obtained in various ways. For example, the proper quantity of water-soluble sodium salt, water-soluble potassium salt and water-soluble calcium salt can be weighed out and diluted with the required, measured amount of distilled water to give the solution. Alternatively, solutions can be prepared which are concentrates to be diluted with water to give the necessary solutions. The latter method is preferred and most satisfactory results are obtained using a set of concentrated standard solutions having the sodium, calcium and potassium content given in milliequivalents per liter of solution in the following Table B:

TABLE B

| Solution | Calcium | Potassium | Sodium |
|---|---|---|---|
| $A^1$ | 1.0 to 3.0 (2.5) | 1.0 to 3.0 (2.5) | 110 to 160 (140) |
| $B^1$ | 3.0 to 6.0 (5.0) | 3.0 to 6.0 (5.0) | 110 to 160 (140) |
| $C^1$ | 6.0 to 10.0 (7.5) | 6.0 to 10.0 (7.5) | 110 to 160 (140) |

The figures in parenthesis in Table B indicate the preferred ingredient content within the stated range for each of the solutions.

The solutions of Table B are used in a manner as indicated in the above example with a 1 to 10 dilution to give final ignition solutions of the compositions listed in Table A.

More concentrated solutions can, of course, be used, e. g., 5 times the concentration of those in Table B, but this introduces problems of accurately measuring small solution quantities and is not recommended. Basically, the standard solutions may have a wide range of concentration and may be larger in number than three provided the ratio of calcium to potassium to sodium content of the solutions is between 1 to 1 to 100 and 1 to 3 to 200, although the best results are obtained using a set of three solutions and the calcium to potassium to sodium ratios between 1:1:110 and 1:3:160 in the first solution, between 3:3:110 and 2:3:80 in the second solution and between 3:3:55 and 3:5:80 in the third solution.

Various compounds may be used to form the standard solutions of the invention but water-soluble salts of calcium, potassium and sodium are preferred. Although the chlorides are most satisfactory, the nitrates, acetates, bromides, formates, oxalates or similar inorganic or organic acid salts which are soluble enough to give the desired aqueous solutions may be used. Obviously, chemically pure salts not contaminated with interfering ions or materials should be used. Dyes may be included to distinguish the separate solutions.

In addition to the sodium, potassium, and calcium salts, the standard solutions ignited for the determinations will contain a deproteinizing agent. This agent may be added, as in the above example, immediately prior to the analysis operation or it may be included as an ingredient in concentrated solutions, such as discussed in connection with Table B. In any event, the deproteinizing agent concentration is not critical and will vary to some extent with the particular material used for deproteinizing. However, for most conditions the agent is preferably included in an amount to give a final ignition solution concentration of about 1 to 10% by weight. Based upon the calcium content of the solutions, the deproteinizing agent can usefully be between about 500 and 2000 times by weight the calcium weight content. The percentage weight figures would be increased, of course, in the case of solutions to be diluted prior to use to give the percentage indicated in the final test solutions.

Trichloroacetic acid is the preferred deproteinizing agent. However, any other which is free from any appreciable sodium, calcium or potassium content known to precipitate protein from aqueous solutions may be used. Examples of other useable deproteinizers are metaphosphoric acid and heavy metal salts, e. g., zinc chloride, mercuric chloride, copper sulfate, silver nitrate and lead acetate.

CONCLUSION

There has been presented above a discussion of new spectrochemical methods for the analysis of some of the alkali metal and alkaline earth metal contents of organic solutions such as urine, blood serum, or similar body fluids. Part of this development involves a new set of standard solutions for spectrochemical analysis.

The discussed standard solutions have been used under actual clinical conditions and have been found to be entirely satisfactory giving results which are accurate and reproducible. The standards overcome interference of phosphorus compounds, proteins, extreme dilutions, and are yet strong enough so that good readings can be obtained for sodium, potassium and calcium. These standards have been found to compensate for deproteinizing agent effect upon potassium and calcium determinations and to buffer against the stray light, spectral band interference and catalytic emission errors caused by sodium.

Using the new methods and compositions of this invention, it is possible to determine with accuracy, speed and reliability, the electrolyte balance in blood serum or similar organic material containing aqueous solutions.

I claim:

1. A process for the spectrochemical determination of the calcium, potassium and sodium concentration in a blood sample which comprises the steps of centrifuging a blood sample to obtain serum, adding 1 part by volume of the serum to 4 parts by volume of a 10% by weight solution of trichloroacetic acid and diluting the mixture with distilled water to make 10 parts by weight of mixture, centrifuging the mixture to obtain a clear solution, aspirating the clear solution streamwise into an oxyacetylene flame, obtaining a spectrophotometric reading for the intensity of the 5540 A. and 7665 A. emission lines of the resulting ignition flame, similarly obtaining the comparable spectrophotometric reading of intensity of said emission lines in the ignition spectra for each of the following solutions:

| Solution | Calcium | Potassium | Sodium | Trichloroacetic Acid |
|---|---|---|---|---|
| A | 5 | 10 | 320 | 40,000 |
| B | 10 | 20 | 320 | 40,000 |
| C | 15 | 30 | 320 | 40,000 | wherein the figures in the columns following the "Solution" column give the concentration of the calcium ion, potassium ion, sodium ion and trichloroacetic acid concentration in parts by weight per million parts of water in said solutions, and obtaining the comparable spectrophotometric reading of intensity of the 5893 A. emission line in the ignition spectrum solutions of sodium chloride in distilled water containing 0.0, 0.5, 1.0, 1.5 and 2.0 milliequivalents of sodium per liter of water.

2. In a process for the spectrochemical determination of the calcium, potassium and sodium concentration in body fluids, the steps of adding a deproteinizing agent to a sample of body fluid, separating clear supernatant liquid from the resulting fluid mixture, aspirating the clear liquid streamwise in a flame, obtaining a spectrophotometric reading for the intensity of a major potassium emission line and a major calcium emission line of the resulting ignition flame and similarly obtaining the comparable spectrophotometric reading of the intensity of the same emission lines in the ignition spectra for each of the following solutions:

| Solution | Calcium | Potassium | Sodium | Deproteinizing Agent |
|---|---|---|---|---|
| A | 4 to 12 | 4 to 12 | 250 to 370 | 30,000 to 50,000 |
| B | 12 to 24 | 12 to 24 | 250 to 370 | 30,000 to 50,000 |
| C | 24 to 40 | 24 to 40 | 250 to 370 | 30,000 to 50,000 | wherein the figures in the columns following the "Solution" column give the concentration of the calcium ion, potassium ion, sodium ion and deproteinizing agent in parts by weight per million parts of water in said solutions.

3. In a process for the spectrochemical determination of the calcium, potassium and sodium concentration in body fluids, the steps of adding a deproteinizing agent to a sample of body fluid, centrifuging the mixture to obtain a clear supernatant liquid, aspirating the clear liquid streamwise in a flame, obtaining a spectrophotometric reading for the intensity of the 5540 A. and 7665 A. emission lines of the resulting ignition flame, and similarly obtaining the comparable spectrophotometric reading of the intensity of said emission lines in the ignition spectra for each of the following solutions:

| Solution | Calcium | Potassium | Sodium | Deproteinizing Agent |
|---|---|---|---|---|
| A | 4 to 12 | 4 to 12 | 250 to 370 | 30,000 to 50,000 |
| B | 12 to 24 | 12 to 24 | 250 to 370 | 30,000 to 50,000 |
| C | 24 to 40 | 24 to 40 | 250 to 370 | 30,000 to 50,000 | wherein the figures in the columns following the "Solution" column give the concentration of the calcium ion, potassium ion, sodium ion and deproteinizing agent in parts by weight per million parts of water in said solutions.

References Cited in the file of this patent

UNITED STATES PATENTS

| | | |
|---|---|---|
| 2,208,096 | Fortune | July 16, 1940 |
| 2,532,687 | Weichselbaum | Dec. 5, 1950 |
| 2,541,056 | Heftman | Feb. 13, 1951 |
| 2,554,972 | Alquist et al. | May 29, 1951 |

FOREIGN PATENTS

| | | |
|---|---|---|
| 599,190 | Great Britain | Mar. 8, 1948 |

OTHER REFERENCES

Barnes et al.: "Flame Photometry," published in Industrial and Engineering Chemistry, vol. 17, No. 10, October 1945, pgs. 605–611.

Overman et al.: "Application of Flame Photometry to Sodium and Potassium Determination in Biological Fluids," pp. 641–649, Journal of Biological Chemistry, vol. 168, April–May 1947.

Gilbert et al.: "Beckman Flame Spectrophotometer," pgs. 772–780, Analytical Chemistry, vol. 22, June 1950.

Nachtrieb: "Principles and Practice of Spectrochemical Analysis," first edition, published in 1950, McGraw-Hill Book Co., Inc., New York, New York, pages 286–296.

McClelland et al.: "The Lundegardh Apparatus: Its Construction and Use," pp. 289–291, Journal of the Society of Chemical Industry (Transactions), vol. 60, November 1941.